United States Patent [19]

Kühni et al.

[11] 4,398,990

[45] Aug. 16, 1983

[54] APPARATUS FOR SEALING A LAMINA ONTO A PLASTIC BAG

[75] Inventors: Heinz Kühni, Burgdorf; Peter Schwaninger, Kirchberg, both of Switzerland

[73] Assignee: Ivers-Lee AG, Berne, Switzerland

[21] Appl. No.: 251,964

[22] Filed: Apr. 7, 1981

[30] Foreign Application Priority Data

Apr. 15, 1980 [CH] Switzerland ......................... 2891/80

[51] Int. Cl.³ ............................................. B32B 35/00

[52] U.S. Cl. ..................................... 156/510; 53/558; 156/516; 156/517; 156/521; 156/556; 156/567; 156/568

[58] Field of Search ............... 156/256, 517, 556, 566, 156/567, 497, 250, 510, 516, 519, 521, 568; 53/412, 413, 414, 415, 416, 419, 451, 485, 558; 29/773, 780, 785

[56] References Cited

U.S. PATENT DOCUMENTS

| | | | |
|---|---|---|---|
| 3,181,989 | 5/1965 | Melanson et al. | 156/566 |
| 3,237,496 | 3/1966 | Bachman | 156/517 |
| 3,555,764 | 1/1971 | Dowling | 156/568 |
| 3,794,545 | 2/1974 | Lucas | 156/519 |
| 3,812,572 | 5/1974 | Weikert | 29/208 B |
| 4,025,385 | 5/1977 | Wood | 156/568 |
| 4,289,567 | 9/1981 | Achelpohl | 156/556 |

FOREIGN PATENT DOCUMENTS

| | | |
|---|---|---|
| 2543592 | 4/1976 | Fed. Rep. of Germany . |
| 832897 | 4/1960 | United Kingdom . |

*Primary Examiner*—Caleb Weston

*Attorney, Agent, or Firm*—Oblon, Fisher, Spivak, McClelland & Maier

[57] ABSTRACT

Aluminum laminae are heat-sealed onto the inside of flat-bottomed plastic bags so that, by bending the lamina double after the bag has been cut open to remove part of its contents, the bag can be reclosed. The apparatus for sealing the laminae on can be incorporated in an existing bag-filling installation. An aluminum strip is supplied to a punching device from a supply roll. A punched-out aluminum lamina is placed upon the upper part of a conveyor lever. The lever is rotated through 180° so that the aluminum lamina to be sealed on comes to be positioned between two layers of a web of plastic material fed by rollers. The ends of the lever are preheated by heating elements in order to accelerate the sealing-on operation. The aluminum lamina is heat-sealed onto the inside of the folded web in such a way that the longer edges of the lamina form an angle of about 45° with the flat bottom of the bag. The rate of production of the existing filling installation can be maintained despite incorporation of the sealing-on apparatus.

4 Claims, 8 Drawing Figures

APPARATUS FOR SEALING A LAMINA ONTO A PLASTIC BAG

Figure 1:
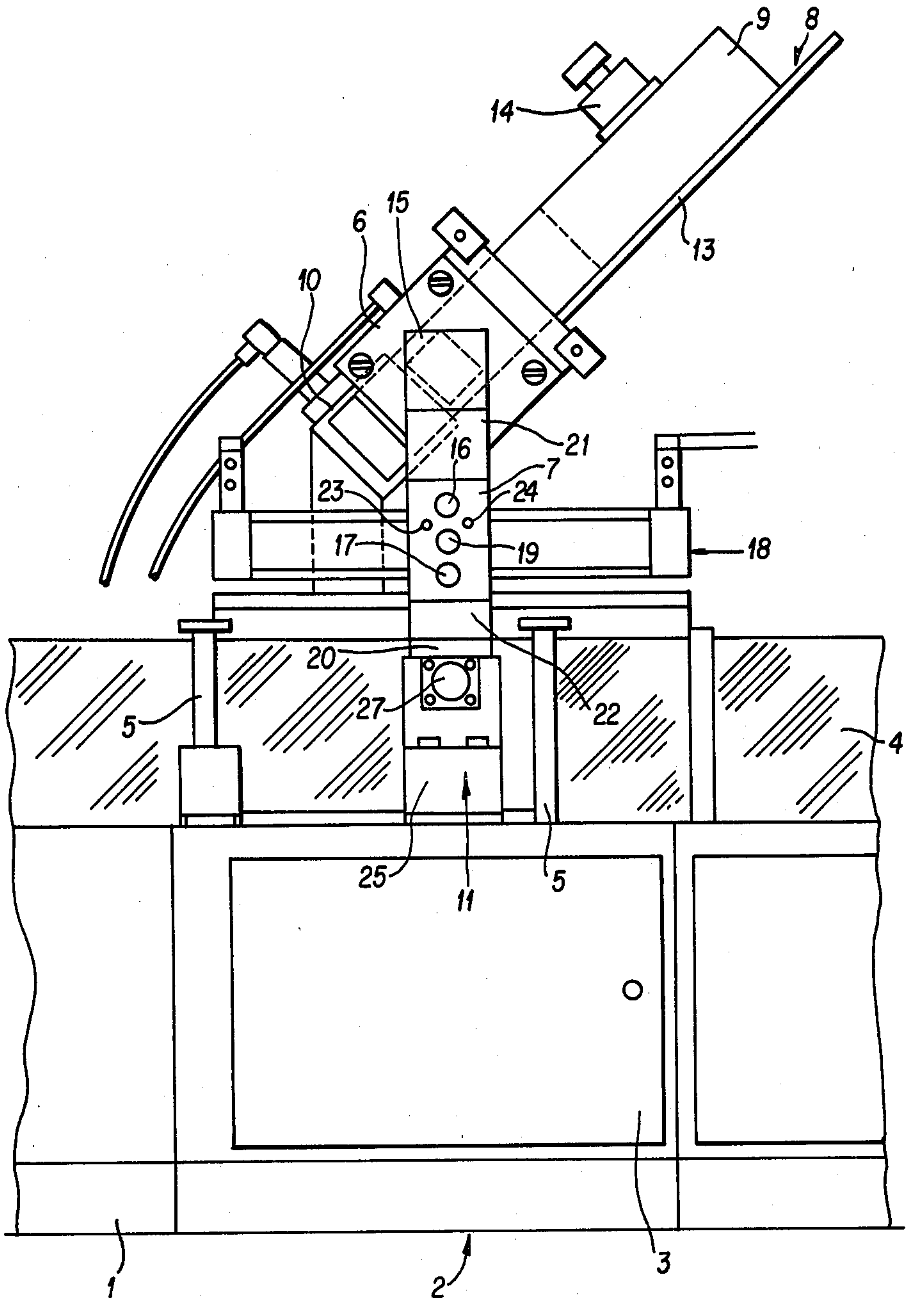

This invention relates to packaging materials and equipment, and more particularly to a method and apparatus for sealing a lamina onto a plastic bag.

In commonly used systems for filling plastic bags, a continuous web of plastic bag material, consisting of interconnected units, is supplied to a folding device from a supply roll. After folding, the units are heat-sealed along the edges to form open bags which are then filled with the product to be packaged. After filling, the bags are separated from one another by means of a cutting device and heat-sealed along the upper edge. The problem with such plastic bags is to be able to reclose them simply and effectively once they have been cut open.

German Disclosed Application (DOS) No. 25 43 592 discloses apparatus for producing reclosable bags in which a closure tape is coated with an adhesive by an applicator and affixed to the bags supplied via a drum. This apparatus cannot readily be incorporated in an installation for filling plastic bags, and what is more, both the affixing of the closure means and the reclosing of the bag are relatively complicated.

U.S. Pat. No. 3,812,572 describes apparatus for attaching dispensing tubes to the sidewalls of bags. Although this apparatus is suitable for being incorporated in filling systems, it is not designed to affix a closure means but rather a tube.

In apparatus for affixing a tie band to a bag as taught by U.S. Pat. No. 3,794,545, the tie band is applied together with a piece of tape cut off a roll of wide tape and provided with an adhesive. This apparatus, too, is not readily suitable for being incorporated in a filling system. Furthermore, the closure means, which must be adhesively affixed, is formed of two parts and necessitates the addition of a tie band and a wide tape.

In U.K. Pat. No. 832,897, a device for adhesively attaching a closure means between two bag foils is described. This apparatus is hardly suitable for being incorporated in a filling installation, and besides that, the closure means must be attached by adhesive means.

It is an object of this invention to provide a method and apparatus for producing plastic bags which can easily be reclosed after having been opened.

A further object of this invention is to provide apparatus for equipping plastic bags with a closure piece, which apparatus can be incorporated in filling systems used heretofore.

Still another object of this invention is to provide apparatus for sealing laminae onto plastic bags, which apparatus can be inserted in a filling system at a desired point where the filling installation has been taken apart for that purpose.

To this end, the apparatus for sealing a lamina onto a plastic bag according to the present invention comprises a feed device for the bags, a conveyor for transporting at least one lamina into the vicinity of a bag, and a heatable sealing device for sealing the lamina onto a side of the bag.

Figure 2:
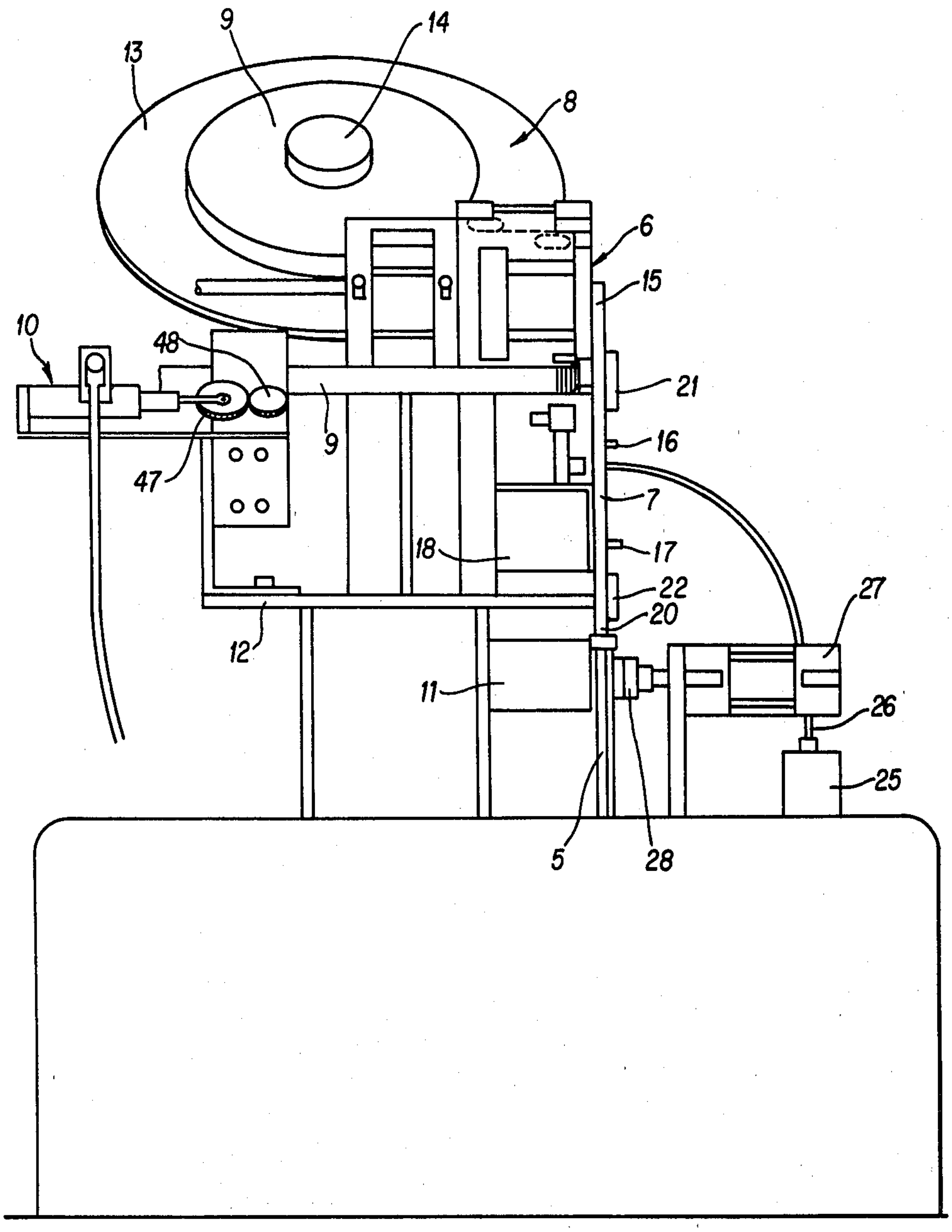
Figure 3:
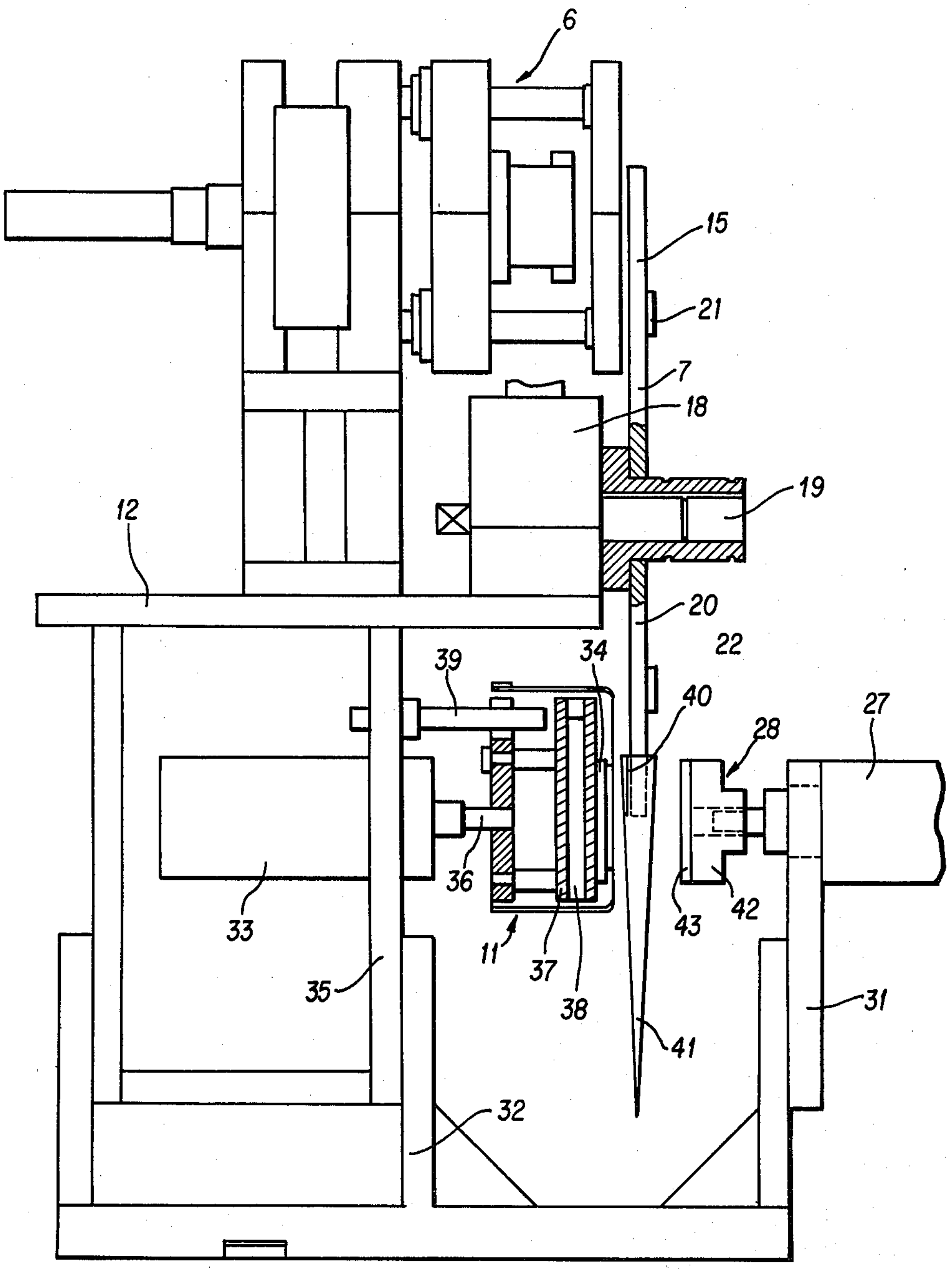
Figure 4:
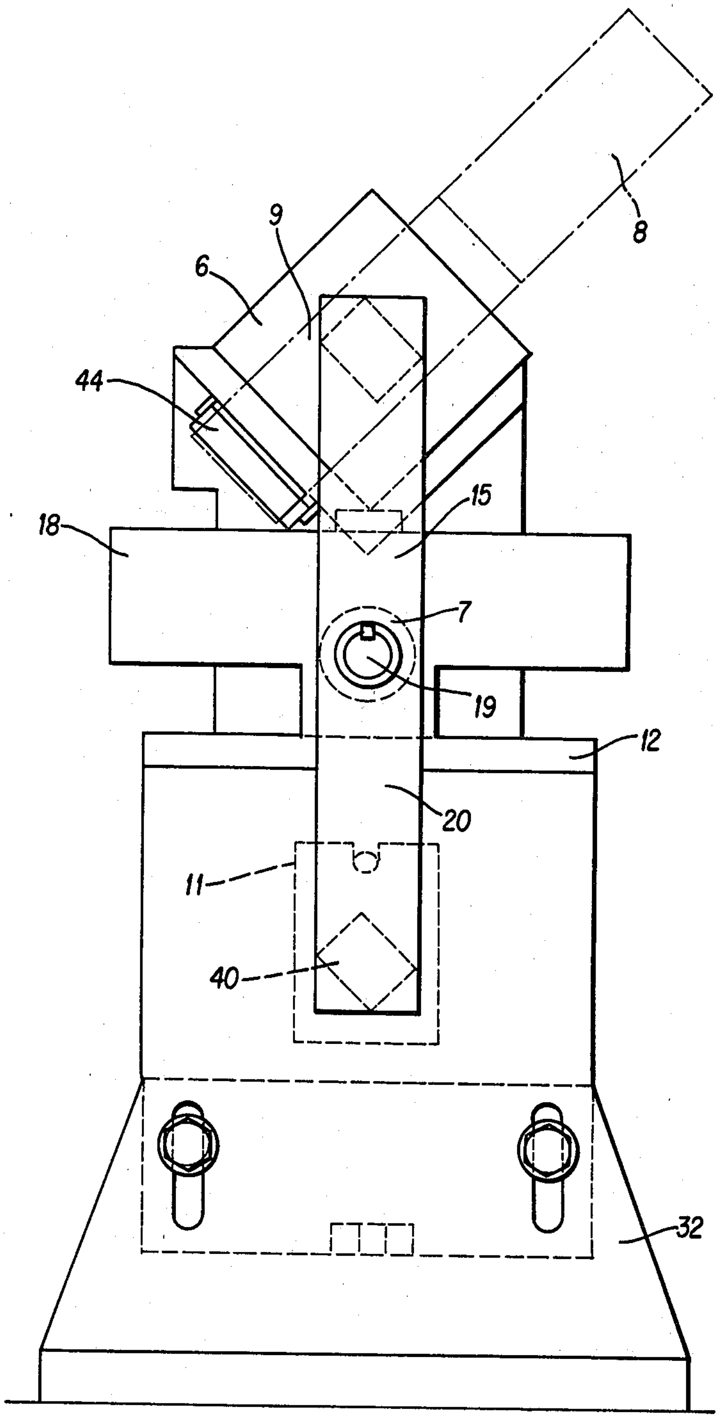
Figure 5:
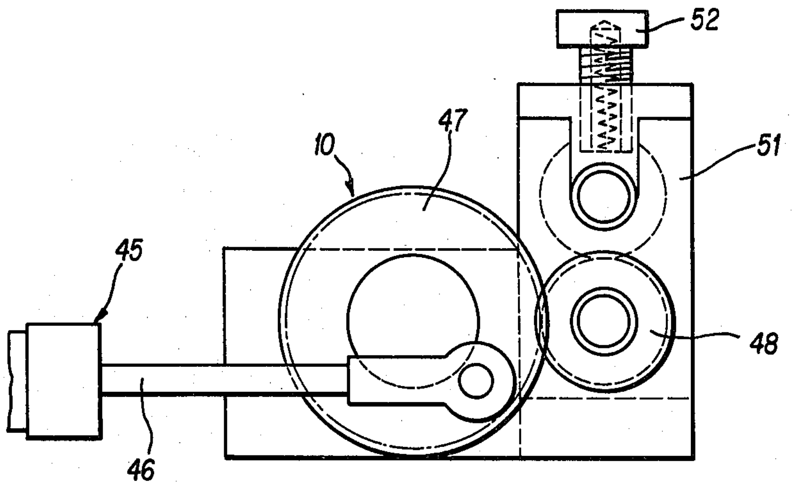
Figure 6:
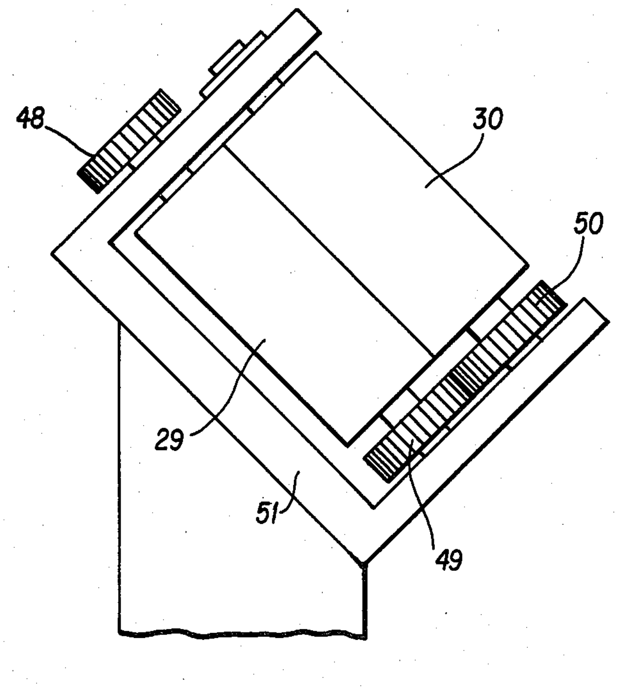
Figure 7:
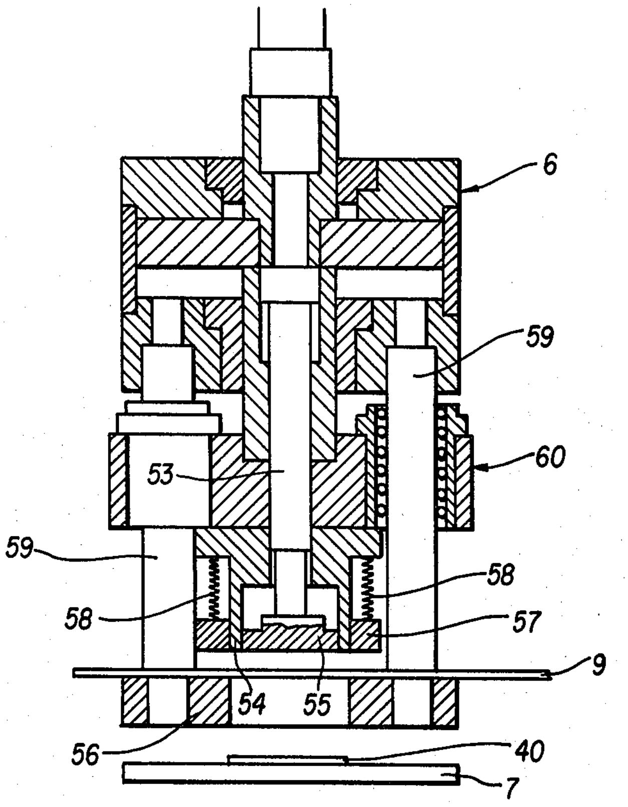
Figure 8:
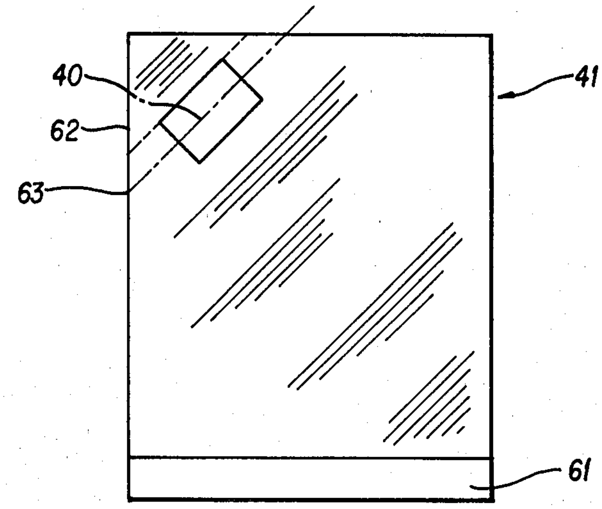

Other objects and advantages of the method and apparatus of the invention will become apparent from the following detailed description of a preferred embodiment thereof, taken in conjunction with the accompanying drawings, in which:

FIG. 1 is a diagrammatic front elevation of the sealing-on apparatus according to the invention, FIG. 2 is a diagrammatic side elevation of the sealing-on apparatus, FIG. 3 is a side elevation of the sealing-on apparatus, partially in section, FIG. 4 is another front elevation of the sealing-on apparatus on a larger scale, FIG. 5 is a section through rollers for feeding a strip of aluminum, FIG. 6 is a top plan view of the roller drive, FIG. 7 is a section through a punching device, and FIG. 8 is a diagrammatic elevation of a plastic bag with a sealed-on aluminum lamina.

The sealing-on apparatus according to the present invention is illustrated diagrammatically in front elevation and side elevation (FIGS. 1 and 2, respectively). An already existing installation 1 is opened, and the sealing-on apparatus 2, with a base 3, is inserted. A control device (not shown) for apparatus 2 is accommodated in base 3. The control is pneumatic, and a cam shaft actuating the various pneumatic control elements is connected to the existing installation 1. A folded double plastic web 4, from which the plastic bags will be cut at a subsequent station, is fed to apparatus 2 via feed rollers 5. Apparatus 2 comprises essentially a punching device 6, a conveyor device taking the form of a lever 7, a supply roll 8 of aluminum strip 9, a feed device 10 for strip 9, and a heatable sealing device 11. The pneumatic and electrical connections are only partially shown in FIGS. 1 and 2. Apparatus 2 is mounted on a support 12.

Supply roll 8 is wound on a spool 14 and disposed on a disk 13 at an angle of preferably 45°. From roll 8, aluminum strip 9 is fed to punching device 6. In a first operation, a lamina is punched out of strip 9 and transferred in a second operation to an arm 15 of lever 7 situated in an upper position. Lever 7 is provided with two vacuum connections 16 and 17 for holding the punched-out lamina (not shown in FIGS. 1 and 2) by suction. After receiving a lamina, lever 7 is rotated through 180° about a spindle 19 by means of a pneumatic lever-control device 18 and thus conveys the aluminum lamina into a plastic bag situated next to sealing device 11. The other arm 20 of lever 7 is now in front of punching device 6. During the sealing-on operation, a new lamina is punched out and placed on lever arm 20. By means of the heated sealing device 11, the aluminum lamina is heat-bonded or fused to the inside of the front plastic web 4. Lever 7 is provided with two heating devices 21 and 22 so that the laminae can be preheated before the sealing-on operation in order to keep this operation as brief as possible in the interest of a high rate of production. Connections 23 and 24 for heating devices 21 and 22 of lever 7 are connected to a heating control unit 25. The temperature is controlled by means of a thermocouple (not shown) provided on one of the two heating devices 21, 22. The thermocouple is connected to control unit 25 by a cable 26.

Opposite sealing device 11 is a thrust plate 28, likewise operated by a pneumatic cylinder 27, for keeping the arm of lever 7 from being bent during the sealing-on operation. The pressure during this operation, which lasts about 0.6 seconds, amounts to some $10^6$ Pa.

The strip remnant remaining after punching-out of the aluminum laminae is drawn off by means of two feed rollers 29 and 30 driven, also pneumatically, by feed device 10.

Details of punching device 6 and sealing device 11 may be seen in FIG. 3. Support 12 bearing these devices and a holder 31 for pneumatic device 27 operating thrust plate 28 are secured to a chassis 32. A pneumatic control cylinder 33 for a sealing plate 34 is fixed to a vertical holding plate 35 of support 12. A sealing plate holder 37 containing a heating device 38 for heating plate 34 is reciprocated by means of a piston rod 36 and guided by rods 39. Sealing plate holder 37 is spring mounted in order to rest optimally flat against the aluminum lamina 40 and lever 7.

During the sealing-on operation, lamina 40 is on the inside surface of the left-hand side of the plastic bag 41, as viewed in FIG. 3. To carry out this operation, thrust plate 28, comprising a metal ram 42 covered with a layer 43 of plastic material, is moved toward the left, as viewed in FIG. 3, by pneumatic operating device 27.

FIG. 4 shows punching device 6 and sealing device 11 in front elevation, as well as a guide roller 44 for aluminum strip 9.

Device 10 for driving feed rollers 29 and 30 may be seen in FIGS. 5 and 6. A connecting rod 46 operated by a pneumatic cylinder-piston unit 45 drives a gearwheel 47 meshing with a further gearwheel 48 connected to roller 29 for rotation therewith. Rollers 29 and 30 have meshing gearwheels 49 and 50, respectively, at their lower ends, so that roller 29, driven by unit 45, drives roller 30 via gearwheels 49 and 50. The rollers are held in a frame 51. Preferably, one roller has a metal surface and the other a rubber surface. Such an arrangement has proved to effect a more uniform feed of aluminum strip 9 than can be obtained with two rubber or two metal rollers. By means of a tightening screw 52, rollers 29 and 30 can be pressed together to the desired extent in order to ensure an optimum feed of strip 9.

Punching device 6 is shown in detail in FIG. 7. A pneumatically operated piston 53 is connected to a punching tool 54 and a conveyor plate 55. In a first operation, punching tool 54 punches a lamina 40 out of aluminum strip 9, pressing against a die 56. In a second operation, punched-out lamina 40 is transferred to lever 7 with the aid of conveyor plate 55. An outer ring 57 concentric with tool 54 presses on strip 9 during punching, tool 54 and plate 55 being displaced in the direction of lever 7 against the bias of springs 58. Sets of springs 60 are disposed on guide rods 59 for shock absorption during the punching operation.

FIG. 8 shows plastic bag 41 with aluminum lamina 40 heat-bonded or fused to it. The longer edges of lamina 40 form an angle of 45° with the flat base 61 of bag 41. The bag is cut open along broken line 62. To reclose the bag, aluminum lamina 40 is bent double along dot-dash line 63.

In another embodiment of the apparatus according to the invention, the various parts might be operated mechanically instead of pneumatically. Furthermore, it would also be possible to feed the aluminum foil linearly, e.g., by means of grippers.

One advantage of the sealing-on apparatus described above is that it can be incorporated in existing installations without difficulty. A production rate of 40–45 units per minute can be achieved. During the sealing-on process, a code number or date can be stamped into the metal lamina at the same time. Securing of the aluminum lamina to an inside wall of the bag presents the advantage of precluding any injury to the user, e.g., to a fingernail. The aluminum lamina sealed onto a plastic bag as described above offers a simple and reliable means of reclosing the bag after it has been cut open.

What is claimed is:

1. Apparatus for sealing a lamina onto a plastic bag, comprising feed means for feeding said bag to said apparatus, conveyor means for transporting at least one said lamina into the vicinity of said bag, and heatable sealing means for sealing said lamina onto a side of said bag, wherein said conveyor means comprise a lever having two ends and pivotable about an axis, and at least one heating element respectively disposed on each of said two lever ends.

2. The apparatus of claim 1, further comprising punching means for punching out a said lamina to be transferred to said conveyor means and a supply roll for supplying a strip wound thereupon to said punching means.

3. The apparatus of claim 1 including means for filling said bag.

4. The apparatus of claim 1, further comprising a magazine for the stacking of said laminae.

* * * * *